(12) United States Patent
Ippel

(10) Patent No.: US 9,213,450 B2
(45) Date of Patent: Dec. 15, 2015

(54) TOUCH SENSOR

(75) Inventor: Scott C. Ippel, Spring Lake, MI (US)

(73) Assignee: TPK Touch Solutions Inc., Taipei (TW)

( * ) Notice: Subject to any disclaimer, the term of this patent is extended or adjusted under 35 U.S.C. 154(b) by 802 days.

(21) Appl. No.: 12/619,907

(22) Filed: Nov. 17, 2009

(65) Prior Publication Data

US 2010/0123675 A1 May 20, 2010

Related U.S. Application Data

(60) Provisional application No. 61/218,668, filed on Jun. 19, 2009, provisional application No. 61/115,191, filed on Nov. 17, 2008.

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01)

(58) Field of Classification Search
CPC ..... G06F 3/044; G06F 3/0412; G06F 1/1692; G06F 3/041; G06F 2203/04111; G06F 3/0416; G02F 1/13338
See application file for complete search history.

(56) References Cited

U.S. PATENT DOCUMENTS

| | | |
|---|---|---|
| 3,020,193 A | 2/1962 | Seck |
| 3,293,743 A | 12/1966 | Barnard |
| 3,415,706 A | 12/1968 | Ettre |
| 4,290,052 A | 9/1981 | Eichelberger et al. |
| 4,318,958 A | 3/1982 | Piatt |
| 4,490,227 A | 12/1984 | Bitter |
| 4,650,557 A | 3/1987 | Bitter |
| 4,655,811 A | 4/1987 | Bitter |
| 4,786,767 A | 11/1988 | Kuhlman |
| 4,838,656 A | 6/1989 | Stoddard |
| 4,864,084 A | 9/1989 | Cardinale |
| 4,931,782 A | 6/1990 | Jackson |
| 5,011,732 A | 4/1991 | Takeuchi et al. |
| 5,062,198 A | 11/1991 | Sun |
| 5,239,152 A | 8/1993 | Caldwell et al. |
| 5,277,986 A | 1/1994 | Cronin et al. |
| 5,525,264 A | 6/1996 | Cronin et al. |
| 5,530,240 A | 6/1996 | Larson et al. |
| 5,538,905 A | 7/1996 | Nishioka et al. |
| 5,604,626 A | 2/1997 | Teowee et al. |
| 5,668,663 A | 9/1997 | Varaprasad et al. |
| 5,673,041 A | 9/1997 | Chatigny et al. |

(Continued)

FOREIGN PATENT DOCUMENTS

| | | |
|---|---|---|
| WO | WO 2009/006512 | 1/2009 |
| WO | WO 2009/018094 | 2/2009 |

*Primary Examiner* — Joseph Haley
*Assistant Examiner* — Ifedayo Iluyomade
(74) *Attorney, Agent, or Firm* — Gokalp Bayramoglu

(57) ABSTRACT

A touch sensor includes a substrate having a first surface and a second surface opposite the first surface, and a transparent conductive layer disposed on the second surface of the substrate. The transparent conductive layer is disposed in a pattern so that the transparent conductive layer includes a plurality of discrete conductive pads, with the pads being conductively connected to at least one connecting region of the substrate via respective conductive traces. The pads are associated with respective buttons of a display device disposed at the substrate, such that the user may touch or approach the substrate and pads at selected areas in response to the displayed buttons as viewed by the user through the pads and substrate.

6 Claims, 4 Drawing Sheets

(56) References Cited

U.S. PATENT DOCUMENTS

| | | |
|---|---|---|
| 5,689,157 A | 11/1997 | Jitsukata et al. |
| 5,719,705 A | 2/1998 | Machol |
| 5,724,187 A | 3/1998 | Varaprasad et al. |
| 5,725,957 A | 3/1998 | Varaprasad et al. |
| 5,729,379 A | 3/1998 | Allemand et al. |
| 5,742,118 A | 4/1998 | Endo et al. |
| 5,838,483 A | 11/1998 | Teowee et al. |
| 5,900,275 A | 5/1999 | Cronin et al. |
| 6,001,486 A | 12/1999 | Varaprasad et al. |
| 6,040,939 A | 3/2000 | Demiryont et al. |
| 6,087,012 A | 7/2000 | Varaprasad et al. |
| 6,163,313 A | 12/2000 | Aroyan et al. |
| 6,261,700 B1 | 7/2001 | Olson et al. |
| 6,277,485 B1 | 8/2001 | Invie et al. |
| 6,329,925 B1 | 12/2001 | Skiver et al. |
| 6,344,288 B1 | 2/2002 | Oyama et al. |
| 6,362,414 B1 | 3/2002 | Fujisawa et al. |
| 6,380,480 B1 | 4/2002 | Norimatsu et al. |
| 6,395,863 B2 | 5/2002 | Geaghan |
| 6,440,491 B1 | 8/2002 | Varaprasad et al. |
| 6,444,898 B1 | 9/2002 | Fujisawa et al. |
| 6,488,981 B1 | 12/2002 | Richter et al. |
| 6,549,193 B1 | 4/2003 | Huang et al. |
| 6,620,454 B2 | 9/2003 | Varaprasad et al. |
| 6,627,918 B2 | 9/2003 | Getz et al. |
| 6,690,268 B2 | 2/2004 | Schofield et al. |
| 6,706,552 B2 | 3/2004 | Getz et al. |
| 6,727,895 B2 | 4/2004 | Bottari et al. |
| 6,787,240 B2 | 9/2004 | Getz |
| 6,842,171 B2 | 1/2005 | Richter et al. |
| 7,004,592 B2 | 2/2006 | Varaprasad et al. |
| 7,165,323 B2 | 1/2007 | Halsey, IV et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,370,983 B2 | 5/2008 | DeWind et al. |
| 7,446,650 B2 | 11/2008 | Schofield et al. |
| 7,507,438 B2 | 3/2009 | Cherif et al. |
| 7,574,794 B2 | 8/2009 | Halsey, IV et al. |
| 7,626,749 B2 | 12/2009 | Baur et al. |
| 2001/0024685 A1 | 9/2001 | Boulton et al. |
| 2002/0031622 A1 | 3/2002 | Ippel et al. |
| 2002/0086188 A1 | 7/2002 | Halsey, IV et al. |
| 2003/0090803 A1* | 5/2003 | Kusuda ............... 359/601 |
| 2004/0137240 A1 | 7/2004 | Halsey, IV et al. |
| 2006/0050018 A1 | 3/2006 | Hutzel et al. |
| 2006/0082192 A1 | 4/2006 | Dubay et al. |
| 2006/0266640 A1 | 11/2006 | Halsey, IV et al. |
| 2008/0062148 A1* | 3/2008 | Hotelling et al. ............ 345/174 |
| 2009/0002338 A1* | 1/2009 | Kinoshita et al. ............ 345/174 |
| 2009/0008161 A1* | 1/2009 | Jones et al. ............ 178/18.06 |
| 2009/0015736 A1 | 1/2009 | Weller et al. |
| 2009/0128516 A1* | 5/2009 | Rimon et al. ............ 345/174 |
| 2009/0205879 A1 | 8/2009 | Halsey IV et al. |
| 2009/0262092 A1 | 10/2009 | Halsey, IV et al. |
| 2009/0322705 A1 | 12/2009 | Halsey, IV |
| 2010/0007616 A1* | 1/2010 | Jang ............ 345/173 |
| 2010/0026656 A1* | 2/2010 | Hotelling et al. ............ 345/174 |

* cited by examiner

TOUCH SENSOR

CROSS REFERENCE TO RELATED APPLICATIONS

The present application is related to U.S. provisional applications, Ser. No. 61/218,668, filed Jun. 19, 2009; and Ser. No. 61/115,191, filed Nov. 17, 2008, which are hereby incorporated herein by reference in their entireties.

FIELD OF THE INVENTION

The present invention relates generally to touch sensors or touch screens.

BACKGROUND OF THE INVENTION

Various touch screens or sensors are known. Examples of known touch sensors or touch screens and coatings implemented on such touch sensors or touch screens are described in U.S. Pat. Nos. 6,488,981; 6,549,193; 6,727,895; and 6,842,171, which are hereby incorporated herein by reference in their entireties.

SUMMARY OF THE INVENTION

The present invention provides a touch sensor or touch screen that includes a substrate coated with a conductive coating that is established at the surface of the substrate in a pattern of discrete pads and traces. The conductive pads are established to generally correspond with buttons displayed by a display device or element or screen at the touch sensor, such as behind the coated substrate so that the buttons displayed by the display device are viewed through the substrate and transparent conductive pads. The touch sensor may provide a scrolling function by determining a direction of movement of a finger across a single discrete pad (such as a large pad established at the substrate) or by determining a direction of movement of a finger along a series of pads (such as M-shaped pads or other suitable shaped pads) arranged or disposed along the substrate.

According to an aspect of the present invention, a touch sensor includes a substrate having a first surface and a second surface opposite the first surface, and a transparent conductive layer disposed on the second surface of the substrate. The transparent conductive layer is disposed in a pattern so that the transparent conductive layer comprises a plurality of discrete conductive pads, with the pads being conductively connected to at least one connecting region of the substrate via respective conductive traces. The pads are associated with respective buttons of a display device disposed at the substrate, such that the user touches or approaches the substrate and pads at selected areas in response to the displayed buttons as viewed by the user through the pads and substrate.

According to another aspect of the present invention, a method of manufacturing a touch sensor includes providing a substrate having a first surface and a second surface opposite the first surface, and disposing a transparent conductive layer on the second surface of the substrate, wherein the transparent conductive layer is disposed in a pattern so that the transparent conductive layer comprises a plurality of discrete conductive pads. The conductive pads are conductively connected to respective connecting regions of the substrate via respective conductive traces. A display device is disposed at the substrate, wherein the pads are associated with respective buttons of the display device, such that the user touches or approaches the substrate and pads at selected areas in response to the displayed buttons as viewed by the user through the pads and substrate.

These and other objects, advantages, purposes and features of the present invention will become more apparent upon review of the following specification in conjunction with the drawings.

DESCRIPTION OF THE PREFERRED EMBODIMENTS

Figure 1:
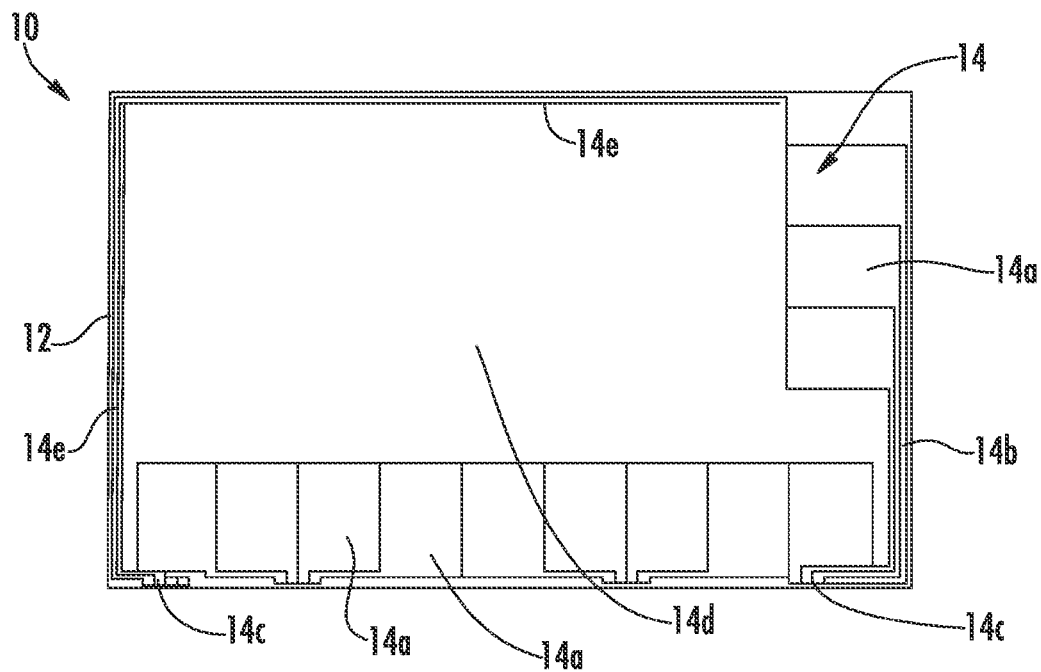
FIG. 1 is a plan view of a touch sensor in accordance with the present invention, shown with discrete ITO pads and a large ITO pad or button for a scrolling function.
Figure 3:
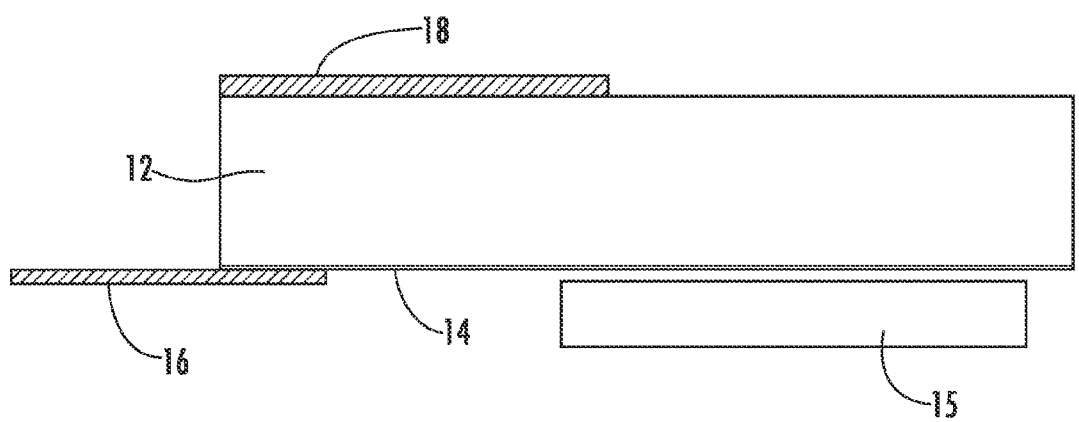
FIG. 3 is a sectional view of a portion of a touch sensor in accordance with the present invention.
Figure 4:
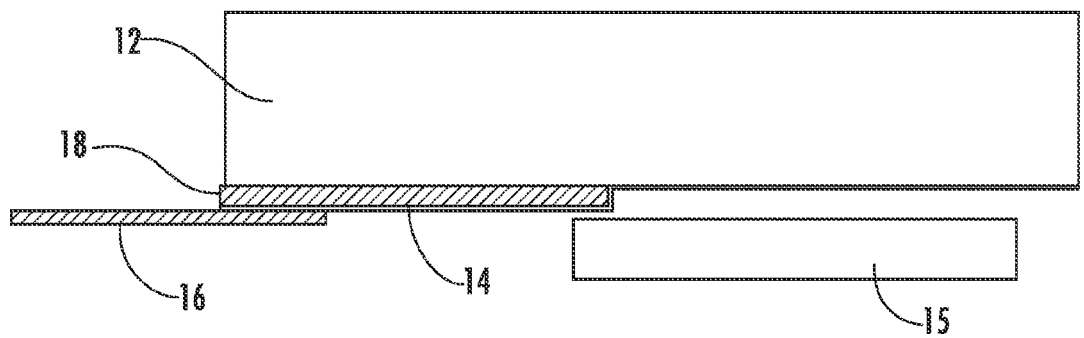
FIG. 4 is a sectional view of a portion of another touch sensor in accordance with the present invention.

Referring now to the drawings and the illustrative embodiments depicted therein, a touch sensor 10 in accordance with the present invention is shown in FIG. 1. In the illustrated embodiment, touch sensor 10 includes a rigid or flexible substrate 12 (such as a glass plastic or polymeric substrate or the like) with a transparent conductive layer 14 (such as a coating or layer of TCO or indium tin oxide (ITO) or the like) disposed in a selected pattern on a surface thereof. The transparent conductive pattern is established as discrete pads or conductive portions that correspond with displayed buttons or indicia displayed by a display device or screen 15 (FIGS. 3 and 4) that is disposed behind the substrate such that the displayed buttons or indicia are viewed by a person using the touch sensor through the substrate and through the transparent conductive layer, as discussed below. Optionally, for example, the transparent conductive pattern may be established at a rear surface of the substrate and the touch sensor may sense or detect the presence or touch or proximity of a user's finger (or other object or stylus or the like) at or near or proximate to the front or opposite surface of the substrate (such as by utilizing aspects of projected capacitive sensor technology that is sufficiently sensitive to sense the presence or proximity of an object through the thickness of the substrate, such as a glass substrate or the like) and at or near regions of the front surface that correspond to selected ones of the discrete pads, whereby the sensor or system, responsive to such a detection, may actuate or control the circuitry or device or display function that corresponds with the selected displayed button or icon or indicia or file or photo image or the like.

In the illustrated embodiment, the ITO layer 14 is disposed or established as a plurality of discrete pads 14a (such as via masking during deposition of the ITO layer or via etching or removing portions of the ITO layer after the layer is deposited or established at the surface of the substrate), with the pads 14a having respective discrete conductive traces 14b established to electrically or conductively connect the pads with respective connection points or locations 14c at or near a perimeter region of the substrate for connecting a flexible printed circuit or cable or lead 16 (FIG. 3) or the like, as discussed below. The discrete pads 14a may be established at the substrate 12 so as to match up with or generally align with or overlay or encompass buttons or switches or icons or the like displayed on the display element or display screen 15 (such as a backlit liquid crystal display element or device or module or the like), which is disposed behind the substrate. Thus, a person may touch the substrate at selected locations corresponding to buttons or the like displayed by the display device and viewed by the user through the substrate and transparent conductive pads.

Optionally, the touch sensor may be manufactured or created and/or defined by the following characteristics:

1. Discrete pads of ITO that match up with predefined buttons displayed on the backing Liquid Crystal Display (LCD) or other suitable display device or screen or module 15. These buttons can be located either on the front or the back surface of the glass. If the buttons are located on the front surface of the glass they may or may not be covered with a protective overcoat (such as a $SiO_2$ overcoat or the like).
   a. Optionally, the buttons may be configured in different ways:
      i. A first configuration may provide or establish one discrete pad 14a per button as displayed on the backing LCD (FIG. 1). The size of the discrete pad generally matches up with the size of the displayed button.
      ii. A second configuration (such as shown at touch sensor 10' of FIG. 2) has a "M" pattern 14d' (or other suitable pattern) so that multiple M-shaped ITO pads overlay or encompass one button as displayed on the backing LCD. For example, a strip of M-shaped pads arranged adjacent to one another along the substrate may generally encompass or overlay a plurality of buttons displayed along the portion of the substrate at which the pads are established.
      iii. Optionally, both of the above configurations can be used on the same touch sensor. For example, and as shown in the illustrated embodiment of FIG. 2, the touch screen 10' includes discrete pads 14a' that correspond to respective buttons and the M pattern pad or pads 14d' for providing a scrolling function.
2. The pads 14a, 14a' may be routed (or conductively connected) via respective ITO traces 14b, 14b' to a respective connection point or points 14c, 14c' along the perimeter region or edge of the substrate 12, 12' of the touch sensor 10, 10'.
3. At the connection points, flexible printed circuits (FPC) 16 (FIG. 3) or other suitable electrical connectors or wires or leads may be directly bonded to the ITO using an Anisotropic conductive film (ACF) or other suitable bonding material.
4. The FPC 16 may be connected to a projected capacitive controller to give functionality to the touch sensor or screen.
5. Optionally, the touch sensor can either be configured to be used in a bezeled application or a flush mount application, depending on the particular application of the touch sensor or screen. For example, a touch sensor may be configured as a flush mount touch sensor, such as for a flush mount application that utilizes aspects of the sensors described in PCT Application No. PCT/US08/071034, filed Jul. 24, 2008, which is hereby incorporated herein by reference in its entirety.
6. Functionality of the touch sensor may optionally include or provide one or more of the following functions:
   a. Touch activated functionality—In such an application, when the touch sensor is first touched, anywhere on the sensor or screen, menu buttons may appear giving the users options for the functionality of the touch sensor.
   b. Touch activated buttons—In such an application, the ITO discrete pads may work specifically with respective predefined buttons that control the functionality of the touch sensor or display element (LCD).
   c. Scrolling feature—In such an application, a scrolling feature may be accomplished using either a single ITO pad or multiple ITO pads, such as described above.

Optionally, the touch sensor or touch screen may be manufactured by different methods, depending on the particular application and desired touch sensor functionality. For example, the following are two different exemplary methods that may be implemented to create a desired or appropriate or suitable patterned ITO sheet or layer on a substrate:

Optionally, the discrete pads may be manufactured by laying down or establishing or depositing a continuous sheet or layer of ITO (or other suitable transparent conductive layer or coating) on the substrate and establishing the discrete pads and traces by removing portions of the established sheet or layer, such as by laser deleting the ITO layer or acid etching off the ITO layer at the substrate to establish the desired or appropriate ITO pattern on the substrate.

Optionally, the discrete pads may be manufactured or established using a masking or lift off method. This may be accomplished by applying a masking material at the substrate and then laying down or establishing or depositing a continuous sheet of ITO at or over the masked substrate surface. After the ITO and the mask material are cured together, the mask material is washed off leaving a pattern sheet or layer or coating of ITO with the desired or appropriate ITO pattern or conductive pattern (such as, for example, a plurality of discrete pads and traces and connecting pads or points) on the substrate.

Optionally, for example, the discrete pads as describe above may provide functionality to the screen by either the following methods:

If the discrete pads are configured as shown in FIG. 1, each pad corresponds to a button as displayed by the LCD. When that particular discrete pad is touched, the controller senses a current draw from that particular pad. When current is sensed from that pad, the controller relays it back to the computer or processor to activate that particular button or switch. For this type of configuration, each pad controls one particular button or switch.

Figure 2:
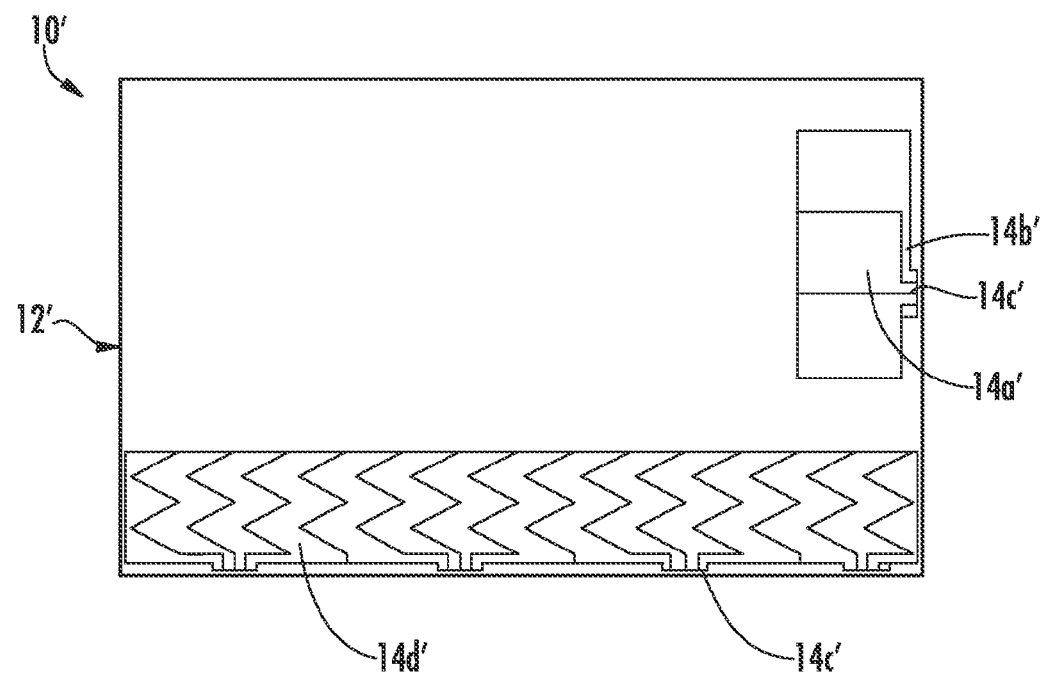
FIG. 2 is a plan view of another touch sensor in accordance with the present invention, shown with discrete ITO pads with an "M" pattern for a scrolling function.

If the discrete pads are configured as shown in FIG. 2, multiple pads may overlap the same button. If this is the case, the controller interpolates the current draw from multiple pads to calculate the location of the touch and, responsive to such calculation or determination, relays the touch command back to the computer or processor to activate the appropriate button as displayed on the LCD.

Optionally, the scrolling feature as described above can be achieved using any suitable method, such as, for example, one or more of the following methods:

The first exemplary method may use basic surface capacitive technology. In the illustrated embodiment of FIG. 1, the large ITO button or pad 14d has ITO traces 14e coming off of the left and right side of the button or pad 14d. When a finger touches the large ITO pad or button, current is drawn from each of the sides. If the touch is nearer the left side or edge of the pad, more current is drawn from the left side or edge of the pad. The current draw is inversely proportional to the distance from the right or left edge (in other words, as the distance from the left edge of the pad goes up, the current draw from the left edge of the pad goes down). Therefore, as a finger slides across the large button, the current draws from each side change. For example, as the finger moves from left to right in FIG. 1, the current draw from the left side or edge of the pad decreases while the current draw from the right side or edge of the pad increases. The current draw from the two sides or edges is interpolated by the controller to determine which direction the finger is moving and from that the controller can determine in which direction to scroll.

Optionally, a second method may use the "M" pattern (or other suitable pattern or pad shapes, such as V-shaped pads or the like, with each of the pads encompassing at least a portion of two or more buttons) as shown in FIG. 2. For this type of configuration, the scrolling function may optionally work over top of the strip of buttons. As a finger moves across or along the line of discrete M-shaped pads (such as, for example, left to right in FIG. 2), it pulls current from the nearest pads. As the finger moves, the pads that current is pulled from changes. The controller can sense this change and interpolate the direction of the movement of the finger along the strip of pads and from that it can determine in which direction to scroll.

Optionally, and as discussed above, the touch sensor may be manufactured as a flush mount configuration for a flush mount application. For example, such a flush mount configuration of the touch sensor may be manufactured or established by the following methods:

Optionally, with the ITO on the back surface of the glass, a black masking material 18 (FIG. 3) can be printed on the front surface to cover the metal border of the backing LCD and to cover the FPC connection on the back surface of the glass.

Optionally, the black mask 18' (FIG. 4) may be printed on the back surface of the glass prior to ITO deposition. The patterned ITO may then be sputtered or otherwise established over the black mask and the back surface of the glass.

Thus, the touch sensor of the present invention may utilize a transparent conductive coating (such as a coating or layer of indium tin oxide (ITO) or the like) for a capacitive sensor that incorporates some of the benefits of both an analog surface capacitive sensor and a projected capacitive sensor. These benefits include, for example, the following:

The transparency and optical characteristics of an ITO surface capacitive sensor.

The manufacturability of a surface capacitive sensor.

The functionality of both a surface capacitive and a projected capacitive sensor.

The durability of a projected capacitive sensor.

Therefore, the present invention provides a touch sensor or touch screen that includes discrete pads and traces established at a surface of a substrate via a pattern layer or coating of a transparent conductive material, such as ITO or the like, with each of the discrete pads corresponding to a button or buttons of a display screen disposed behind or at the substrate. The touch sensor or system may control or actuate a button or switch in response to detection of a user touching or approaching a portion of the substrate that corresponds to a respective pad or pads at the touch sensor substrate. Optionally, the touch sensor may provide a scrolling function in response to detection of a user's finger moving along or across one or more discrete pads at the touch sensor substrate.

Figure 6:
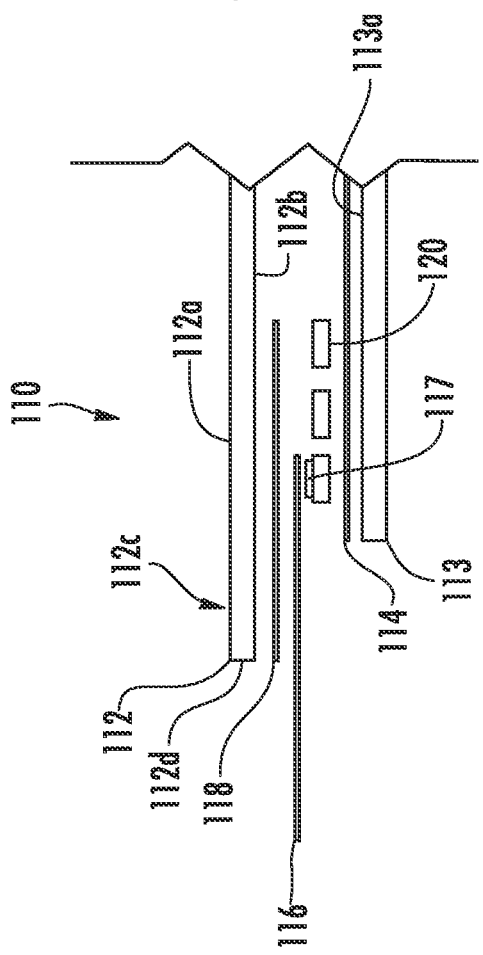
FIG. 6 is a sectional view of a portion of the touch sensor of FIG. 5, shown as mounted at a display screen and frame.
Figure 5:
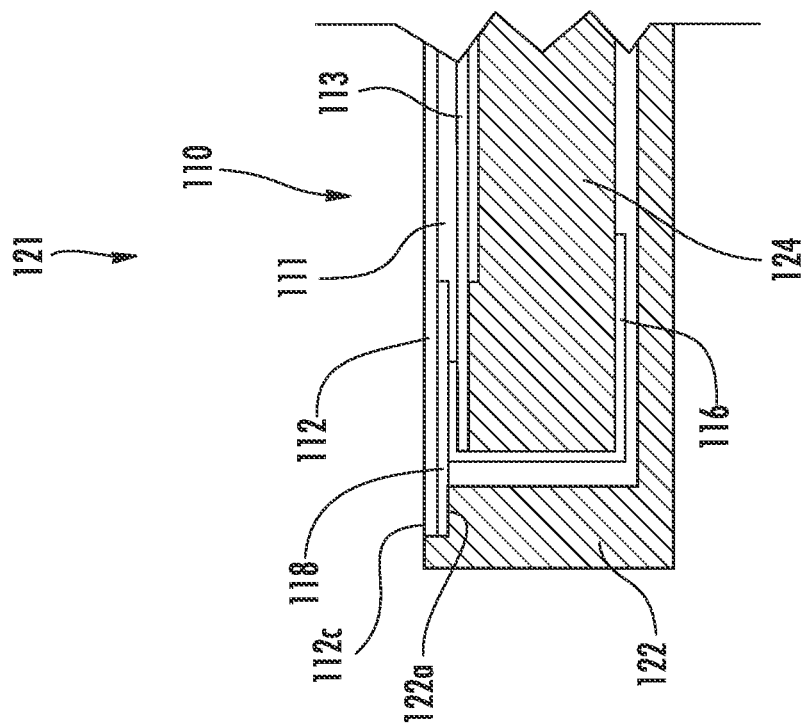
FIG. 5 is a sectional view of a portion of another touch sensor in accordance with the present invention.

Optionally, and with reference to FIGS. 5 and 6, a surface capacitive touch sensor 110 includes a rigid or flexible substrate 112 (such as a glass substrate or a plastic/polymeric substrate or the like) laminated to a base glass substrate or plastic substrate 113 (such as via a light transmitting laminating material 111, such as a light transmitting polyvinylbutyral (PVB), a light transmitting silicone, a light transmitting adhesive or the like, and such as via an autoclave process or a vacuum assisted hot roll process or the like), with a transparent electrically conductive layer 114 (such as a coating or layer of TCO or TAO or indium tin oxide (ITO) or the like) disposed on a surface 113a of the base substrate 113. As shown in FIG. 5, silver conductive pads or connection pads 120 are established (such as by screen printing or the like followed by thermal firing) at the transparent conductive layer 114 for connecting the leads or terminals of the flexible cable or harness or FPC 116 to the conductive surface, such as via an anisotropic conductive film (ACF) 117 or the like disposed at and electrically joining the terminals of the FPC and the silver connection pads. An opaque mask 118 (such as a dark or black or substantially light absorbing masking material, such as a dark colored ink, frit, paint, appliqué, thin film or the like) is disposed around a perimeter border region of the underside or second surface 112b of front cover sheet or substrate 112 and generally over or at the regions at which the connection pads 120 are disposed, such that the connection pads 120 and the flexible connector or cable 116 are not visible through the cover substrate 112 to a person viewing the touch sensor 110. In the illustrated embodiment, the cover substrate 112 is oversized compared to the undersized base substrate 113 such that the cover substrate 112 provides an overhang region 112c at least along the perimeter region or regions of the touch sensor where such silver connector pads or the like are disposed.

As shown in FIG. 6, the surface capacitive touch sensor 110 is incorporated in a display device 121 and is received at an open end or portion of a frame or housing 122 that at least partially encloses or encompasses a video display screen 124 (such as a backlit liquid crystal video display screen or the like). The frame or housing 122 has a recess 122a established at its forward surface (the surface viewable to a person viewing the video display screen and touch sensor) and around the perimeter of the display screen. Frame or housing 122 may comprise, for example, a plastic molding with recess 122a established thereat, such as via injection molding or the like. When the touch sensor 110 is disposed at or mounted to the frame or housing 122, the overhang portion of the cover substrate 112 is received at or in recess 122a, while the undersized base glass 113 is received in the frame or housing 122 and is disposed in front of the display screen 124. As can be seen in FIG. 6, the flexible cable 116 is disposed behind the overhang portion and is bent around the perimeter edge of the rear undersized substrate 113 and along the perimeter of the display screen 124 and wraps around the display screen 124 for electrical connection at the rear of or behind the display screen 124.

The recess 122a at the frame or housing 122 may be modified or configured or conformed to nestedly receive the edge of the overhang region 112c of the cover substrate 112 therein, thereby providing functional benefits, including at least partially and preferably substantially hiding or occluding from direct view by an observer looking through the first outer surface of the cover substrate 112 the cut edges 112d of cover substrate 112. Also, for example, by nestedly receiving the overhang perimeter regions of cover substrate 112 at the recess 122a of frame 122, the frame 122 substantially encompasses the cut edges 112d and may obviate the need for pencil seaming of the cut edges so that any potentially sharp edges of the cut edge of the cover substrate will be received in or recessed in the frame portion or housing such that a person handling the display device cannot or will not cut themselves on the cut edges 112d of cover substrate 112. Also, by nestedly receiving the overhang perimeter regions of cover substrate 112 at the recess 122a of frame 122, the interface between the overhang region 112c and frame 122 may form a debris and/or moisture seal between the touch sensor 110 and the display frame 122 to limit or substantially preclude water/debris intrusion or contamination in the frame or housing and/or between the cover substrate and base substrate and/or between the touch sensor and the display screen. Optionally, the frame or housing may have contoured edges and/or may include user inputs or mechanical buttons and/or the like established at the frame or housing, such as at the sides or rear or front perimeter border region of the frame or housing.

Thus, the present invention provides a flush mountable surface capacitive touch screen that may have its outer or first surface (outer surface 112a of cover substrate 112) generally flush with or coplanar with the outer surface of the display frame or housing 122. The overhang region allows for the flush mounting of the touch screen to the display frame, while allowing for the flexible cable or connector to extend rearward from the touch screen and along the display screen for electrical connection at or near or rearward of the rear of the display screen. The opaque perimeter coating 118 conceals or renders covert the portion of the frame at which the overhang portion of the cover substrate is received at, and conceals or renders covert the electrical connector and connection pads at and between the substrates 112, 113.

Thus, the opaque perimeter mask is deposited on an oversized piece of top glass and the flexible cable is routed around the edge of the undersized base glass. The edge treatment (such as seaming or the like) at the perimeter edges of the top glass substrate is enhanced and made easier due to the nesting of the perimeter edges of the cover substrate in the recess of the frame or housing (whereby the cut edges of the cover substrate need not be pencil seamed or the like). The flexible cable or FPC wraps around the rear or base glass substrate and around the display screen behind the masked overhang portion of the cover substrate, such that the electrical connection at the touch sensor and the flexible cable are not viewable through the perimeter opaque border material by a person viewing the touch sensor and display screen. The overhang portion of the cover sheet or substrate is received in a recess of the display frame or housing so that the touch sensor is flush-mounted at the display frame, with the flexible cable or FPC tucked behind the touch sensor and display screen and not viewable by a person viewing the touch sensor and display screen. Although shown and described as a surface capacitive touch sensor, aspects of the touch sensor 110 may be suitable for application to other types of touch sensors, such as other capacitive touch sensors (such as projected capacitive sensors or the like) and/or resistive touch sensors and/or the like.

Optionally, the perimeter border band or coating 118 of touch sensor 110 may comprise any suitable coating or material, depending on the particular application of the touch sensor and display device and the desired appearance and/or functions/features of the touch sensor and display device. For example, the perimeter border band may comprise a chromium oxide or "black chrome" (such as by utilizing aspects of the coatings described in U.S. provisional applications, Ser. No. 61/186,204, filed Jun. 11, 2009; and/or Ser. No. 61/164,593, filed Mar. 30, 2009, and/or U.S. Pat. No. 7,184,190 and/or U.S. Pat. No. 7,255,451, which are hereby incorporated herein by reference in their entireties), or the perimeter border band may comprise a reflective material or band or the like, such as, for example, a metallic mirror reflector such as a thin film coating or stack of coatings of a metal, such as chromium or ruthenium or the like. Optionally, the information display device may include at the border region (such as established at the perimeter border band), a logo (such as a company name, trademark or brand mark, such as, for example, "3M" or "iTOUCH" or the like) or an icon or instructions (such as, for example, "this side up" or "touch this side next") or the like (such as to provide a desired appearance or message at the frame or housing or display screen, such as by utilizing aspects of the display devices described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2005, now U.S. Pat. No. 7,626,749; and/or Ser. No. 11/243,783, filed Oct. 5, 2005, and/or U.S. provisional application Ser. No. 61/187,069, filed Jun. 15, 2009, which are all hereby incorporated herein by reference in their entireties).

Such instructions preferably are keyed to or linked to what may be appearing on the display screen at a given time. For example, for a photo viewer application or function, a menu or selection of potential folders may illuminate and/or be visible (preferably in a display-on-demand manner) that are associated with different folders or albums or menu paths that may be associated with a particular photograph or item being displayed. Optionally, and desirably, the perimeter border band is itself touch sensitive or touch responsive (preferably independent of the touch response or sensitivity of the main touch area of the touch sensor) so that, for example, a finger on the left hand of the user may be accessing a touch sensitive area of the perimeter border band at the left most perimeter region of the display area as being viewed by the user, while substantially simultaneously or closely concurrently, a finger on the right hand of the user may be making a selection at the main touch area of the device.

Optionally, the perimeter border band may comprise a partially light transmitting and partially light reflective band or coating, such as a transflective display-on-demand reflective band or coating or a transflective display-on-demand non-reflective band or coating. Optionally, the perimeter border band may have or may be disposed at an active display or the like at a border region of the touch sensor (such as, for example, a partially light transmitting display element disposed over a plurality of illumination sources or an array of illumination sources or the like, such as a plurality of light emitting diodes (LEDs) or organic light emitting diodes (OLEDs) or the like, disposed behind the partially light transmitting perimeter border band or coating or element, such as at or recessed in the housing or frame portion of the display device at the recessed portion of the housing that receives the overhang region of the cover sheet of the touch sensor). Optionally, for example, the perimeter border band may be etched (such as via laser etching or the like, such as by utilizing aspects of the mirror assemblies disclosed in U.S. Pat. No. 4,882,565, which is hereby incorporated herein by reference in its entirety) so that when an illumination source or LED or telltale is activated or illuminated or energized, the illumination may pass through the etched icon or indicia or the like and would be viewable by a person viewing the display device. Optionally, for example, the perimeter border band may be partially transmissive of visible light therethrough, and an illumination source or sources (such as a plurality of LEDs or OLEDs or the like) may be disposed behind the perimeter border band whereby the illumination sources and/or icons or indicia or the like disposed or established at the illumination sources and behind the perimeter border band may, when the illumination source or sources is/are activated or energized, be viewable through the perimeter border band via the light emitted by the illumination sources passing through the partially light transmissive perimeter border band.

Optionally, for applications with such display and/or touch features at the overhang region, the overhang region and/or the perimeter border band and/or the frame or housing portion may be formed or established to accommodate the desired size and shape of the display and/or icons or indicia or the like. For example, the perimeter border band may be locally increased in size to cover or encompass the perimeter display or touch elements or the like disposed at that region or portion of the perimeter region of the touch sensor.

In addition to the use of standard ITO coatings, one or more optical enhancing layers and/or mechanical or durability enhancing layers and/or EMI coating can be added to the surface of the substrate, such as to the front surface coating to adjust the properties (such as the transmissivity properties and/or appearance properties of the sensor) to meet certain customer needs. Such enhancements may include index matching of the layers with air or other media and/or alternating high and low refractive index materials to create various anti-reflective stacks (such as by utilizing aspects of the reflective elements described in U.S. Pat. Nos. 7,274,501; 7,255,451 and/or 7,184,190, and/or U.S. patent application Ser. No. 11/912,576, filed Oct. 25, 2007, now U.S. Pat. No. 7,626,749, which are hereby incorporated herein by reference in their entireties). Optionally, other or alternate materials (to ITO) can be used. For example, such materials may include a flourine-doped tin oxide material or the like, a copper-aluminum material or the like, a zinc oxide or ZnO material or the like, or other non-traditional TCOs if desired or appropriate.

Figure 7:
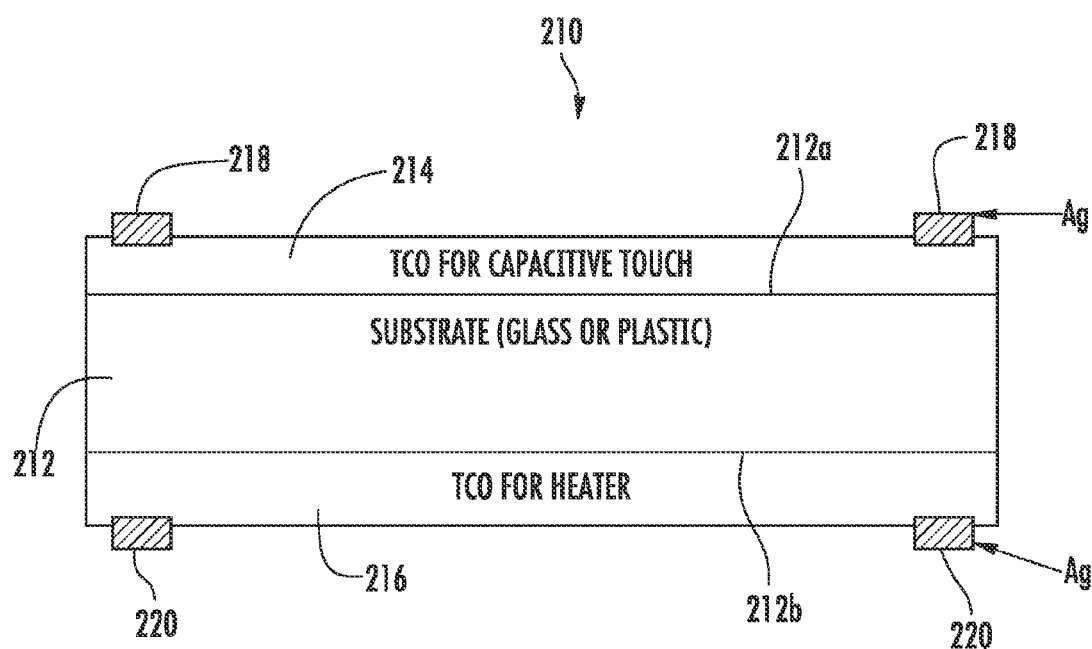
FIG. 7 is a sectional view of another touch sensor in accordance with the present invention.

Optionally, the touch screen or sensor may include a heater element established at its rear surface, such as for heating the touch screen or sensor to reduce or remove condensation on or at the touch sensor. For example, and with reference to FIG. 7, a capacitive touch screen device or sensor 210 includes a substrate 212 (such as a plastic or glass substrate), with a transparent conductive coating 214 established at its front surface 212a and a transparent conductive coating 216 established at its rear surface 212b. The front surface conductive coating 214 has electrical connections or pads 218 for electrically connecting control circuitry to the capacitive touch sensor to determine the location of a touch or proximity at or near the front surface of the touch screen, while the rear surface conductive coating 216 may have electrical connections or pads 220 for electrically connecting a power source or control circuitry to the rear surface conductive coating 220, such as for generating a current across the rear surface conductive coating 220 to heat the rear surface conductive coating. The touch screen or sensor 210 thus incorporates a heater at a surface capacitive, projected capacitive, or discrete pad capacitive touch screen construction.

A typical capacitive touch screen or sensor may include a backshield established the rear surface of its substrate. However, a capacitive touch screen or sensor may be manufactured with or without such a backshield. The backshield may comprise a sputtered ½ wave indium tin oxide (ITO) film (such as a film or layer or coating of around 1450 angstroms thick or more or less, depending on the particular application) for the benefit of low resistivity and enhanced transmission. Not all devices need a backshield as the electronic controller can handle the shielding. If the shielding is not being utilized on the touch screen or sensor, the conductive coating at the rear surface of the substrate may be used for a heater.

Optionally, for example, a backshield conductive coating or layer or element may be used as a heater application to remove condensation on or at the touch screen or sensor. The conductive coating or layer or element may comprise any suitable conductive coating, such as a transparent conductive coating comprising ITO or any other suitable transparent metal oxide or the like. The heater coating electrical connection may incorporate connecting electrical leads or wires directly to the rear surface conductive coating or layer or element (or optionally to a rear surface silver frit, silver ink or conductive tape established at the rear surface of the substrate), such as at connecting pads (such as silver pads or other suitable electrically conductive pads) or the like established at the rear surface and in electrical conductivity with the rear surface coating or layer or element.

The processes and/or finished touch sensors or touch screen products of the present invention may utilize aspects of the processes and/or products described in U.S. Pat. Nos. 4,490,227; 4,650,557; 4,655,811; 5,725,957; 6,001,486; 6,087,012; 6,440,491; 6,620,454; 6,627,918; 6,706,552; 6,488,981; 6,549,193; 6,727,895; 6,842,171; 6,787,240; and/or 7,165,323; and/or U.S. patent application Ser. No. 09/946,228, filed Sep. 5, 2001; Ser. No. 09/974,209, filed Oct. 10, 2001; Ser. No. 10/744,522, filed Dec. 23, 2003; Ser. No. 10/798,171, filed Mar. 11, 2004; Ser. No. 11/218,374, filed Sep. 2, 2005, now U.S. Pat. No. 7,507,438; Ser. No. 11/440,855, filed May 25, 2006; Ser. No. 12/430,323, filed Apr. 27, 2009; Ser. No. 12/513,960, filed May 7, 2009; and/or Ser. No. 12/537,620, filed Aug. 7, 2009, and/or U.S. provisional application Ser. No. 61/151,977, filed Feb. 12, 2009, and/or PCT Application No. PCT/US08/68987, filed Jul. 2, 2008, and/or PCT Application No. PCT/US08/071034, filed Jul. 24, 2008, which are all hereby incorporated herein by reference in their entireties.

The display device or screen may comprise any suitable display device or screen or module, such as a liquid crystal display device or the like. Optionally, for example, the display device may utilize aspects of the display devices described in U.S. Pat. Nos. 7,004,592; 5,530,240; 6,329,925; 6,690,268; 5,668,663; 5,724,187; 7,195,381; 7,255,451; 7,274,501; 7,446,650; 7,184,190; and/or 7,370,983, and/or U.S. patent application Ser. No. 12/091,525, filed Apr. 25, 2008; Ser. No. 10/538,724, filed Jun. 13, 2005; and/or Ser. No. 11/912,576, filed Oct. 25, 2007, now U.S. Pat. No. 7,626,749, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A touch sensor comprising:
   a substrate having a first surface and a second surface opposite the first surface;
   a transparent conductive layer disposed on the second surface of the substrate, wherein the transparent conductive layer is disposed in a pattern so that the transparent conductive layer comprises a plurality of discrete conductive pads, the discrete conductive pads substantially overlay the entire substrate and are conductively connected to at least one connecting region of the substrate via respective conductive traces, and wherein the plurality of discrete conductive pads are formed at a first touch area and a second touch area, wherein the first touch area is formed on sides of the second touch area, and the size of said discrete conductive pads at the first touch area is substantially different from the size of said pads at the second touch area, and wherein the second touch area comprises only one first pad of the pads and the first touch area comprises a plurality of second pads of the pads, and wherein the second pads are arranged on sides of the first pad; and wherein the discrete conductive pads at the first touch area are associated with respective buttons of a display device disposed at the substrate, such that the user touches or approaches the substrate and pads at the first touch area in response to the displayed buttons as viewed by the user through the pads and substrate.

2. The touch sensor of claim 1, wherein the size of the first pad is larger than each of the second pads, and wherein the second pads are arranged in an L-shaped pattern on two adjacent sides of the first pad.

3. The touch sensor of claim 1, wherein when a finger slides across the first pad, electric current draw from sides of the first pad is interpolated by a controller to determine which direction the finger is moving and from so that the controller determines in which direction to scroll.

4. The touch sensor of claim 1, further comprising an external electrical connector disposed on the second surface of the substrate, wherein the external electrical connector is located a perimeter area of the substrate, and wherein the display device is located on the second surface of the substrate.

5. The touch sensor of claim 4, further comprising a masking layer formed on the first surface of the substrate, wherein the masking layer covers the external electrical connector and a border region of the display device.

6. The touch sensor of claim 1, further comprising a masking layer and an external electrical connector formed on the second surface of the substrate, wherein a section of the transparent conductive layer is formed on the masking layer in a perimeter area of the substrate, and the external electrical connector is connected to the section of the transparent conductive layer.

* * * * *